J. H. EDWARD.
Harvester.
No. 44,857. Patented Nov. 1, 1864.
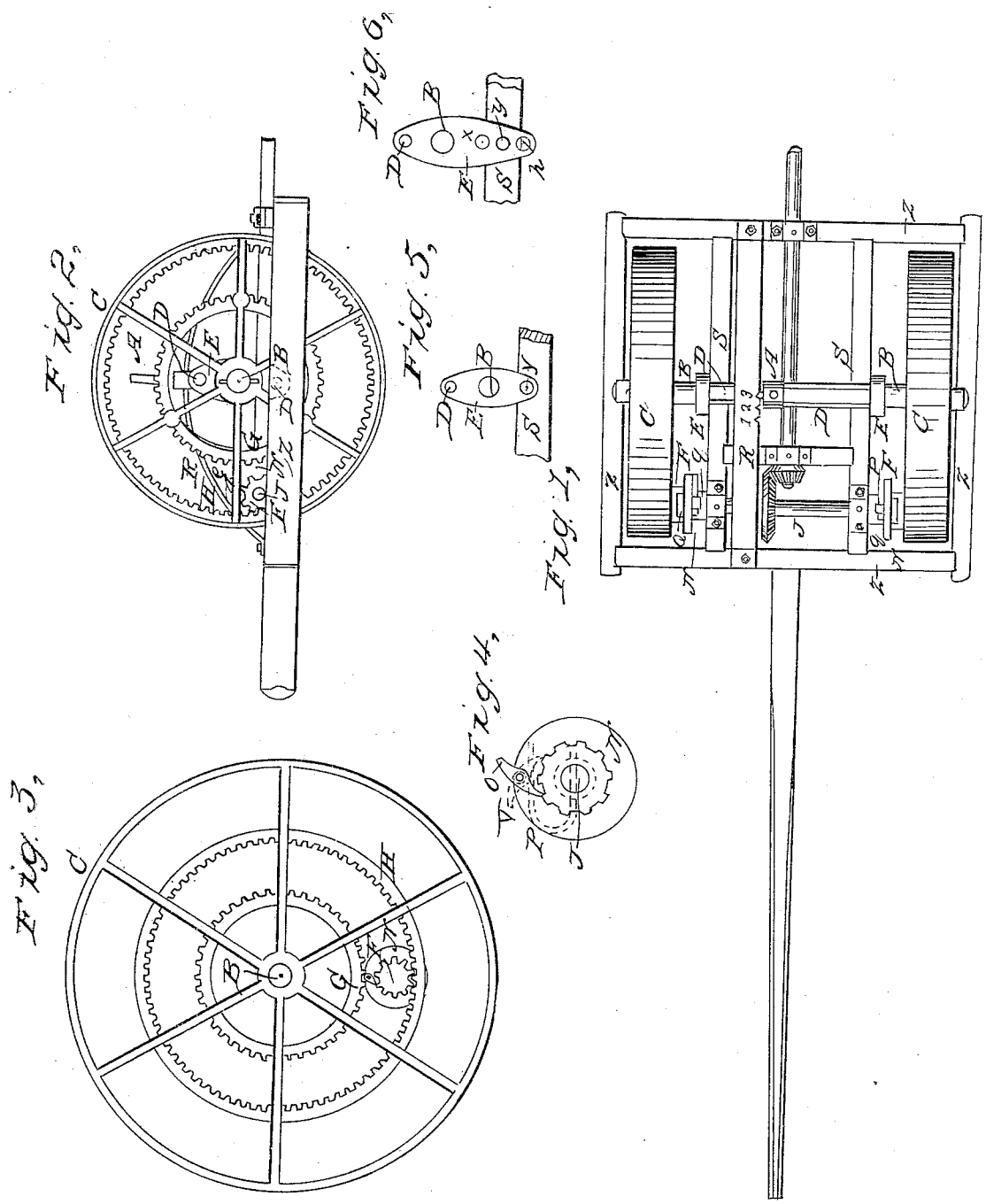

UNITED STATES PATENT OFFICE.

JOHN H. ELWARD, OF OTTAWA, ILLINOIS, ASSIGNOR TO HIMSELF AND WILLIAM H. W. CUSHMAN.

IMPROVEMENT IN HARVESTERS.

Specification forming part of Letters Patent No. 44,857, dated November 1, 1864.

*To all whom it may concern:*

Be it known that I, JOHN H. ELWARD, of Ottawa, in the county of LaSalle and State of Illinois, have invented a new and useful Improvement in Gearing of Reaping-Machines; and I do hereby declare that the following is a full, clear, and exact description of the construction and operation of the same, reference being had to the annexed drawings, making a part of this specification, in which—

Figure 1 represents a top view. Fig. 2 represents a side view. Fig. 3 represents a view of enlarged wheel. Fig. 4 is a section representing pinion-plate and double-spring ratchet. Fig. 5 is a section representing one of the hinges or eccentrics upon which wheels and frame operate. Fig. 6 represents a section of hinge or eccentric for enlarged wheel.

In order that those skilled in the art may be enabled to construct this improvement, I will describe its construction and operation.

The object of this invention is to increase or decrease the motion of the sickle without change of gearing or other machinery.

Z represents the main frame of a harvesting-machine, which supports the gearing.

Y represents a shaft, which has its bearings in the parts S of the main frame, and to whose outer ends the levers E are firmly secured. The axle B of the driving-wheel C passes through said levers E, and the upper ends of said levers are connected by means of a rod, D.

A represents a hand-lever, which is secured to the main axle B and to the rod. By means of this lever the axle B and its driving-wheels can be moved forward or backward, so as to bring either of its gear-wheels G H in contact with the pinions F, which transmit the motion to the cutting apparatus, and as the gear-wheels G H have different diameters the speed of the pinions F is accordingly increased or decreased. When the lever A is thrown in its proper position it is sprung in either of the notches 1 2 3 of the arc R. By placing the lever in the front notch, 1, Fig. 1, it increases the speed of the sickle. By placing the pinion F in the outer or larger gear, H, when the lever is put in notch 2, Fig. 1, it places the pinion directly between the two gears, thereby stopping the motion of the sickle entirely. By throwing the lever into notch 3, Fig. 1, it gives the sickle a slow motion, in consequence of the pinion F being thrown into the small gear G. Now, the advantage claimed by this arrangement is as follows: First, in combined reapers and mowers it is necessary, when the machine is used as a mower, that the sickle should have a very rapid motion in order to cut the grass with ease and prevent the clogging of the sickle by the grass, which is often drawn into the fingers without being cut, thereby clogging the sickle and often breaking the machine. This is caused for want of sufficient speed. On the other hand, it does not need a very rapid motion for cutting grain. It generally, being dry, cuts very easy, and when in cutting it if the sickle has a very rapid motion it does no good, but is an injury to the machine by the excess of motion. This I propose to remedy when cutting grain, by placing the pinion F in smaller driving-gear, G, and, when mowing, to connect it with the larger gear, H. Next, in order to turn this machine with ease it is necessary often for one of the driving-wheels to move backward while the other moves forward. Now, if the pinions F F, Fig. 1, were attached firmly to shaft J, Fig. 1, this turning operation could not be performed. This I remedy by permitting pinions F to turn loosely upon shaft J, while the strong metallic plate N is firmly secured to said shaft at the side of this metallic plate N. I attach the double-ended pawl O, Fig. 4, which is held in its place by elliptic spring P, as shown in dotted lines, Fig. 4. This pawl, O, acts against the inner ends of the cogs in pinion F, and holds the pinion firmly when the wheels are driving ahead, thereby turning the shaft J and driving the sickle; but when either one or both of the wheels are reversed, as in turning a corner, the pawl O depresses the spring P, and allows the pinion F to turn without turning the shaft. This is the case when the pinion is in gear with the outer wheel, H. When it is in gear with the inner wheel, G, the motion of the shaft is reversed. It is therefore necessary to hold the pinion with the other end of the pawl. This I do by depressing the upper end of the pawl O until it acts against the cogs of the pinion F, and thus reverses its action. These pawls I hold in their respective positions by placing a wedge-shaped projection, $q$, on the inner ends of their journals. This wedge-shaped projection holds the ratchets in either position in which they may be placed by being placed upon the spring P in such a manner that the spring P bears firmly against one of its sides, thereby holding the pawls O O in either of their respective positions.

The main driving-wheels C C may be enlarged in any proportion desired between the dimensions of three and six feet in diameter without deranging any of the gearing or raising the frame of the carriage Z any higher from the ground than they are in the common wheel, C, Fig. 2. These wheels C, as represented in Fig. 2, are to be about three feet in diameter. The wheel as represented in Fig. 3 is about six feet in diameter. Now, this enlargement of the wheel may be done as follows: by moving the shaft J, with the pinions F F, back upon the frame I to the desired point, the gearing being enlarged in the driving-wheel. This brings the pinions F F nearer to the bottom of the driving-gears G and H. In the three-foot wheel the pinions F mesh into the driving-gears G and H on a direct horizontal line with the driving-wheels C C, as in Fig. 2; but in the six-foot wheel the pinions F F will mesh directly in the bottom of the driving-gears H G, as shown in Fig. 3. In the six-foot wheel it is necessary to use the long lever E, as represented in Fig. 6, which may be provided with a number of holes, $x$ $y$ $z$, &c., so as to make its length adjustable in securing it upon the shaft Y, and it may be raised or lowered any distance desired.

Having thus fully described the nature of my invention, what I claim herein as new, and desire to secure by Letters Patent, is—

1. Supporting the main axle of the driving-wheels C by a pair of hinged levers, E, whereby said axle and its driving-wheels can be thrown forward and backward, substantially in the manner and for the purposes described.

2. In combination with the loose pinion F, the double-spring pawl O, when provided with the wedge-shaped projections $q$, so as to make it reversible, substantially in the manner and for the purpose described.

J. H. ELWARD.

Witnesses:
T. R. COURTNEY,
A. LYNCH.